United States Patent
Lin et al.

(10) Patent No.: US 10,846,319 B2
(45) Date of Patent: Nov. 24, 2020

(54) ONLINE DICTIONARY EXTENSION OF WORD VECTORS

(71) Applicant: Adobe Inc., San Jose, CA (US)

(72) Inventors: Zhe Lin, Fremont, CA (US); Yingwei Li, La Jolla, CA (US)

(73) Assignee: Adobe Inc., San Jose, CA (US)

( * ) Notice: Subject to any disclaimer, the term of this patent is extended or adjusted under 35 U.S.C. 154(b) by 191 days.

(21) Appl. No.: 15/924,791

(22) Filed: Mar. 19, 2018

(65) Prior Publication Data
US 2019/0286716 A1    Sep. 19, 2019

(51) Int. Cl.
*G06F 16/33*   (2019.01)
*G06F 16/35*   (2019.01)
*G06F 40/242*  (2020.01)

(52) U.S. Cl.
CPC ...... *G06F 16/3347* (2019.01); *G06F 16/3338* (2019.01); *G06F 16/355* (2019.01); *G06F 40/242* (2020.01)

(58) Field of Classification Search
None
See application file for complete search history.

(56) References Cited

U.S. PATENT DOCUMENTS

| | | | | |
|---|---|---|---|---|
| 9,460,712 B1* | 10/2016 | Strope | ...... | G06Q 30/02 |
| 2005/0022114 A1* | 1/2005 | Shanahan | ...... | G06F 16/93 |
| | | | | 715/234 |
| 2006/0149558 A1* | 7/2006 | Kahn | ...... | G10L 15/18 |
| | | | | 704/278 |
| 2008/0091427 A1* | 4/2008 | Olsen | ...... | G10L 15/197 |
| | | | | 704/254 |
| 2009/0024392 A1* | 1/2009 | Koshinaka | ...... | G10L 15/18 |
| | | | | 704/257 |
| 2009/0055381 A1* | 2/2009 | Wu | ...... | G06F 40/258 |

(Continued)

FOREIGN PATENT DOCUMENTS

JP    2001014337    1/2001

OTHER PUBLICATIONS

Arora,"RAND-WALK: A latent variable model approach to word embeddings", Jul. 22, 2016, 33 pages.

(Continued)

*Primary Examiner* — Neeraj Sharma
(74) *Attorney, Agent, or Firm* — SBMC

(57) ABSTRACT

Online dictionary extension of word vectors techniques and systems are described that are configured to provide online extension of existing word vector dictionaries and thus overcome the failures of conventional techniques. In one example, a dictionary extension system is employed by a computing system to extend a word vector dictionary to incorporate a new word in an online manner Co-occurrence information is estimated for the new word with respect to the words in the existing dictionary. This is done by estimating co-occurrence information with respect to a large word set based on the existing dictionary and sparse co-occurrence information for the new word. The estimated co-occurrence information is utilized to estimate a new word vector associated with the new word by projecting the estimated co-occurrence information onto the existing word vector dictionary. An extended dictionary is created incorporating the original dictionary and the estimated new word vector.

20 Claims, 6 Drawing Sheets

(56) References Cited

U.S. PATENT DOCUMENTS

| | | | | |
|---|---|---|---|---|
| 2011/0307241 A1* | 12/2011 | Waibel | ................... | G06F 40/58 |
| | | | | 704/2 |
| 2014/0229160 A1* | 8/2014 | Galle | ..................... | G06F 40/20 |
| | | | | 704/9 |
| 2015/0100308 A1* | 4/2015 | Bedrax-Weiss | ....... | G06F 40/242 |
| | | | | 704/10 |
| 2018/0108273 A1* | 4/2018 | Nielson | ................. | A61B 5/048 |

OTHER PUBLICATIONS

Goldberg,"word2vec Explained: Deriving Mikolov et al.'s Negative-Sampling Word-Embedding Method", Feb. 15, 2014, 5 pages.
Pennington,"GloVe: Global Vectors for Word Representation", EMNLP. vol. 14. 2014., Sep. 2014, 12 pages.
"Combined Search and Examination Report", GB Application No. 1900191.6, dated Jun. 21, 2019, 8 pages.

* cited by examiner

ONLINE DICTIONARY EXTENSION OF WORD VECTORS

BACKGROUND

Word vectors are a useful embedding for representing words and phrases in a continuous vector form. However, training a word vector embedding with a computing device is time-consuming, and once the embedding is trained conventional techniques are unable to add new words to the embedding. Conventional techniques to include novel words in a word vector embedding require that the entire embedding be retrained. Such a brute force strategy is computationally difficult and inefficient. Additionally, retraining a word vector embedding with a computing device generates new word vectors for the previously included words and cannot ensure that previously computed word vectors remain unchanged. Retraining the entire embedding and changing previously computed word vectors will break, for instance, the functionality of computing systems utilizing the word vectors such as neural networks for natural language processing. Thus, conventional techniques for dealing with adding novel words to a word vector embedding by a computing device are inefficient, inflexible, and hinder systems from adapting to or incorporating novel words. This causes computing systems built upon a word vector embedding, such as natural language processing systems, to be rigidly limited to a vocabulary used when initially establishing the system.

SUMMARY

Techniques and systems for online dictionary extension of word vectors are described that are configured to provide online extension of existing word vector dictionaries and thus overcome the failures of conventional techniques. In one example, a dictionary extension system is employed by a computing system to extend a dictionary of word vectors to incorporate a new word in an online manner. This may be used, for instance, by a natural language processing system of a computing device that utilizes a neural network or other machine learning technique calibrated or initialized according to a particular vector space. By providing an online extension of a word vector dictionary that incorporates new words without altering the vector space, the natural language processing system can continue to operate and incorporate the new word vectors without invalidating or rendering useless prior training or results.

Co-occurrence information is estimated by the dictionary extension system for the new word with respect to the existing words in the dictionary. This is done by estimating co-occurrence information for a large word set based on the existing dictionary and sparse co-occurrence information over a small word set. As a result, co-occurrence information for the new word is obtained by the dictionary extension system without determining new co-occurrence information for the entire dictionary.

The dictionary extension system utilizes the estimated co-occurrence information to estimate a new word vector associated with the new word, for instance, by projecting the estimated co-occurrence information for the new word onto the existing word vector dictionary. Thus, these techniques support creating a new word vector without affecting existing word vectors or altering the vector space. The dictionary extension system utilizes the estimated new word vector to create an extended dictionary that incorporates the previous word vector dictionary, the new word, and the estimated new word vector. This allows a system utilizing the word vectors to incorporate the new word in a computationally cheap and efficient manner without any adverse effect to the system.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
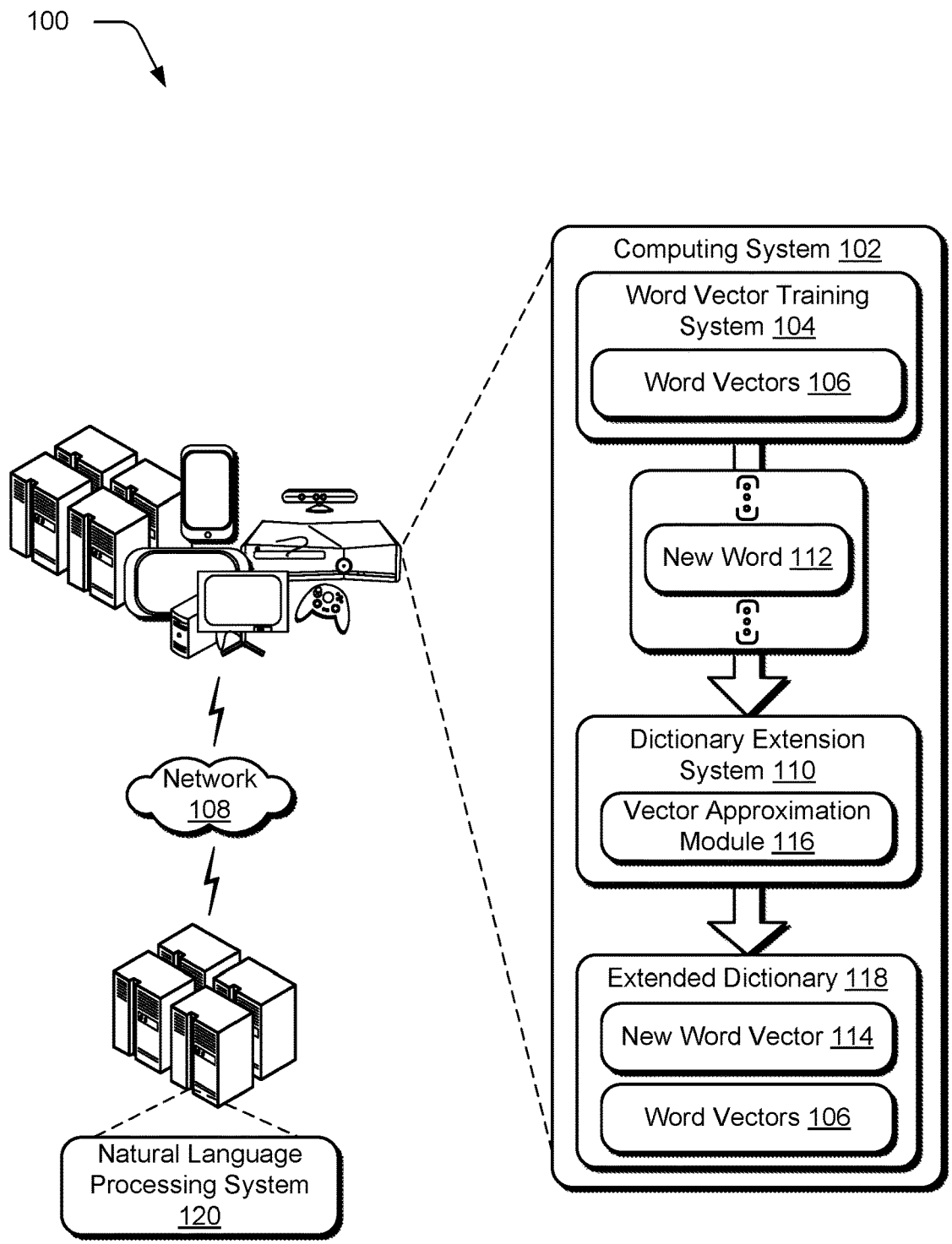
FIG. 1 is an illustration of an environment in an example implementation that is operable to employ online dictionary extension techniques as described herein.

Word vectors are a useful embedding for representing words and phrases in a continuous vector form. However, training a word vector embedding is time-consuming, and once the embedding is trained conventional techniques are unable to add new words to the embedding. Conventional techniques to include novel words in a word vector embedding require the training of an entirely new embedding. Such a brute force strategy is computationally expensive and inefficient. Additionally training a new word vector embedding computes new word vectors for the previously included words and cannot ensure that previously computed word vectors remain unchanged.

Accordingly, techniques and systems for online dictionary extension of word vectors are described that are configured to provide online extension of existing word vector dictionaries. These techniques support extending a word vector dictionary to include a new word without retraining the word vector embedding or altering the previously computed word vectors. To do so, the dictionary extension system receives an existing word vector dictionary and a new word not included in the word vector dictionary. Association and co-occurrence information is then estimated by the dictionary extension system for the new word with respect to the existing words in the word vector dictionary. This is done by estimating co-occurrence information for a large word set based on the existing word vector dictionary and sparse co-occurrence information over a small word set. As a result, co-occurrence information for the new word is obtained without determining new co-occurrence information for the entire dictionary.

The dictionary extension system then creates an estimated new word vector associated with the new word, without re-calculating the existing word vectors. To do so, the dictionary extension system projects the estimated co-occurrence information for the new word onto the existing word vector dictionary. These techniques support creating a new word vector without affecting the existing word vectors or altering the vector space, and thus do not suffer from limitations of conventional techniques. The dictionary extension system utilizes the estimated new word vector to create an extended dictionary that incorporates the previous word vector dictionary, the new word, and the estimated new word vector. This allows a system utilizing the word vectors to incorporate the new word without any adverse effect to the system. For example, a natural language processing system may utilize a neural network model built on top of the dictionary. While conventional techniques creating an entirely new word vector embedding would break the neural network model, the techniques leveraged by the dictionary extension system herein are able to extend the neural network model to incorporate new words with no adverse effects on prior results or trainings. In addition, the techniques leveraged by the dictionary extension system herein offer a computationally cheap and efficient approximation of the new word vector.

In the following discussion, an example environment is described that may employ the techniques described herein. Example procedures are described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ online dictionary extension techniques described herein. The illustrated environment 100 includes a computing system 102, which may be configured in a variety of ways.

The computing system 102, for instance, may be configured as a desktop computer, a laptop computer, a mobile device (e.g., assuming a handheld configuration such as a tablet or mobile phone as illustrated), and so forth. Thus, the computing system 102 may range from full resource devices with substantial memory and processor resources (e.g., personal computers, game consoles) to a low-resource device with limited memory and/or processing resources (e.g., mobile devices). Additionally, although a single computing system 102 is shown, the computing system 102 may be representative of a plurality of different devices, such as multiple servers utilized by a business to perform operations "over the cloud" as described in FIG. 6.

The computing system 102 is illustrated as including a word vector training system 104. The word vector training system 104 is implemented at least partially in hardware of the computing system 102 to process textual data to generate word vectors 106. Such processing may include, for instance, utilizing a language model to generate vector representations of text sequences as described in greater detail with respect to FIG. 2. The word vectors 106 are vector representations of words that capture semantic meaning of the words. For example, a single one of the word vectors 106 may be a vector with thousands or more dimensions, thereby capable of including significantly more information than is included in the raw ASCII values corresponding to the word. Although illustrated as implemented locally at the computing system 102, functionality of the word vector training system 104 may also be implemented in whole or in part via functionality available via a network 108, such as part of a web service or "in the cloud." For instance, the word vector training system 104 may be located on a separate device that transmits the word vectors 106 to the computing system 102 via the network 108.

The computing system 102 is further illustrated as including a dictionary extension system 110. The dictionary extension system 110 is implemented at least partially in hardware of the computing system 102 to extend the word vectors 106 to incorporate a new word 112, as described in greater detail with respect to FIG. 3. The new word 112 can be any word for which a word vector is not included within the word vectors 106. For example, the word vector training system 104 can generate the word vectors 106 from a general text corpus. The general text corpus contains a finite amount of words and can omit any number of existing words, resulting in the word vectors 106 not including word vectors associated with the omitted existing words. In the context of the dictionary extension system 110, any one of the omitted existing words can be the new word 112. Alternatively, the new word 112 may be a word that did not exist at the time the word vectors 106 were created. In any case, the new word 112 does not directly correspond to any word vector within the word vectors 106.

The dictionary extension system 110 creates a new word vector 114 associated with the new word 112 by utilizing a vector approximation module 116. The vector approximation module 116 operates independently of the word vector training system 104, and is capable of generating the new word vector 114 by approximating values based on the word vectors 106 and without re-generating the word vectors 106. The new word vector 114 is appended to the word vectors 106 to create an extended dictionary 118 incorporating both the word vectors 106 and the new word vector 114. Although illustrated as implemented locally at the computing system 102, functionality of the dictionary extension system 110 and the vector approximation module 116 may also be implemented in whole or in part via functionality available via the network 108, such as part of a web service or "in the cloud."

The extended dictionary 118 may be communicated, for instance, to a natural language processing system 120 via the network 108. The natural language processing system 120 is a computing system that utilizes a word vector embedding to process large amounts of natural language data. For example, the natural language processing system 120 may process natural data for purposes of determining syntactic or semantic word similarities, automatic summarization, machine translation, sentiment analysis, information retrieval, speech recognition, question answering, generating recommendations, comparing images to text, and so forth. To do so, the natural language processing system 120 is calibrated to the vector space of the extended dictionary 118. For instance, the natural language processing system 120 may utilize a neural network model that is built upon an underlying word vector dictionary.

Conventional techniques of creating a new word vector dictionary alter the vector space itself, e.g. by remapping every vector included in the dictionary. Changing the vector space propagates errors throughout the natural language processing system 120. For example, a neural network model built according to a particular vector space will cease to properly function if the vector space of the dictionary is changed, leading to a rigid inflexibility of word vector dictionaries using conventional techniques. In contrast, the environment 100 depicted in FIG. 1 utilizes techniques that extend an existing dictionary to incorporate new words and new word vectors without altering the vector space. This allows the natural language processing system 120 to persist through additions to the dictionary, providing robust and adaptive solutions that cannot be achieved through conventional means.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
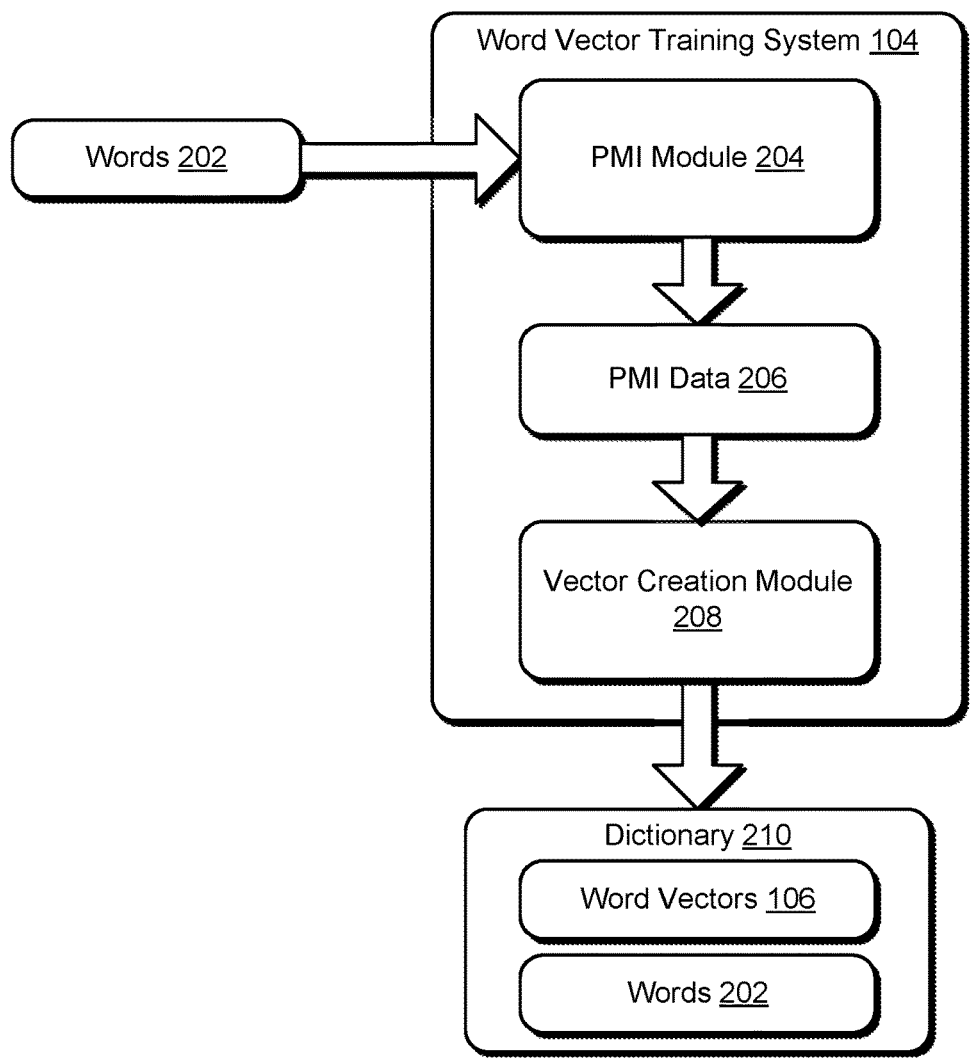
FIG. 2 depicts an example system showing a word vector training pipeline of the word vector training system of FIG. 1 in greater detail.

FIG. 2 depicts a system 200 showing an example word vector training processing pipeline of the word vector training system 104 of FIG. 1 in greater detail to create the word vectors 106. The word vector training pipeline begins by processing input words 202. The input words 202 may be collected or generated from any large collection of text, for example a general collection of text from the website Wikipedia®, the website Reddit®, and so forth. Alternatively, the input words 202 may be gathered from a collection of text related to a particular subject.

The words 202 are input into a pointwise mutual information (PMI) module 204 to generate PMI data 206. The PMI data 206 includes information pertaining to measurements of association and co-occurrence among the words 202. The PMI data 206, for instance, is a measure of how frequently a word occurs with another word. As an example, the PMI data 206 is created by collecting n-gram statistics over the words 202. In some implementations, the PMI data 206 is based on word-level uni-gram or bi-gram statistics. The PMI data 206 may be represented as a matrix of co-occurrences between words. For example, given the words 202 represented as a dictionary V={$w_i$, I=1, 2, 3, ..., N}, the PMI data 206 can be represented as a PMI matrix $M_{[N \times N]}$ where a total probability of co-occurrence M between arbitrary words $w_i$ and $w_j$ is found as the following:

$$M = PMI(w_i, w_j) = \log \frac{p(w_i, w_j)}{p(w_i)p(w_j)}$$

The PMI data 206 is input to a vector creation module 208 to create the word vectors 106. The word vectors 106 may be represented as a matrix of word vectors, or alternatively may be represented as a set of individual vectors. In some implementations, the vector creation module 208 creates a word vector matrix H by decomposing the PMI matrix M with a scaling vector S as:

$$M = USU^T$$

where U represents the Eigen-vector space and:

$$H = US^{-1/2}$$

Each row hi of the column-truncated submatrix $H_{:,1:d}$ may be utilized as a word vector 106 for a respective one of the words 202. The words 202 and the corresponding word vectors 106 can be combined to create a dictionary 210. The dictionary 210 can be utilized in any system that leverages vector representations of words, such as natural language processing systems.

Figure 3:
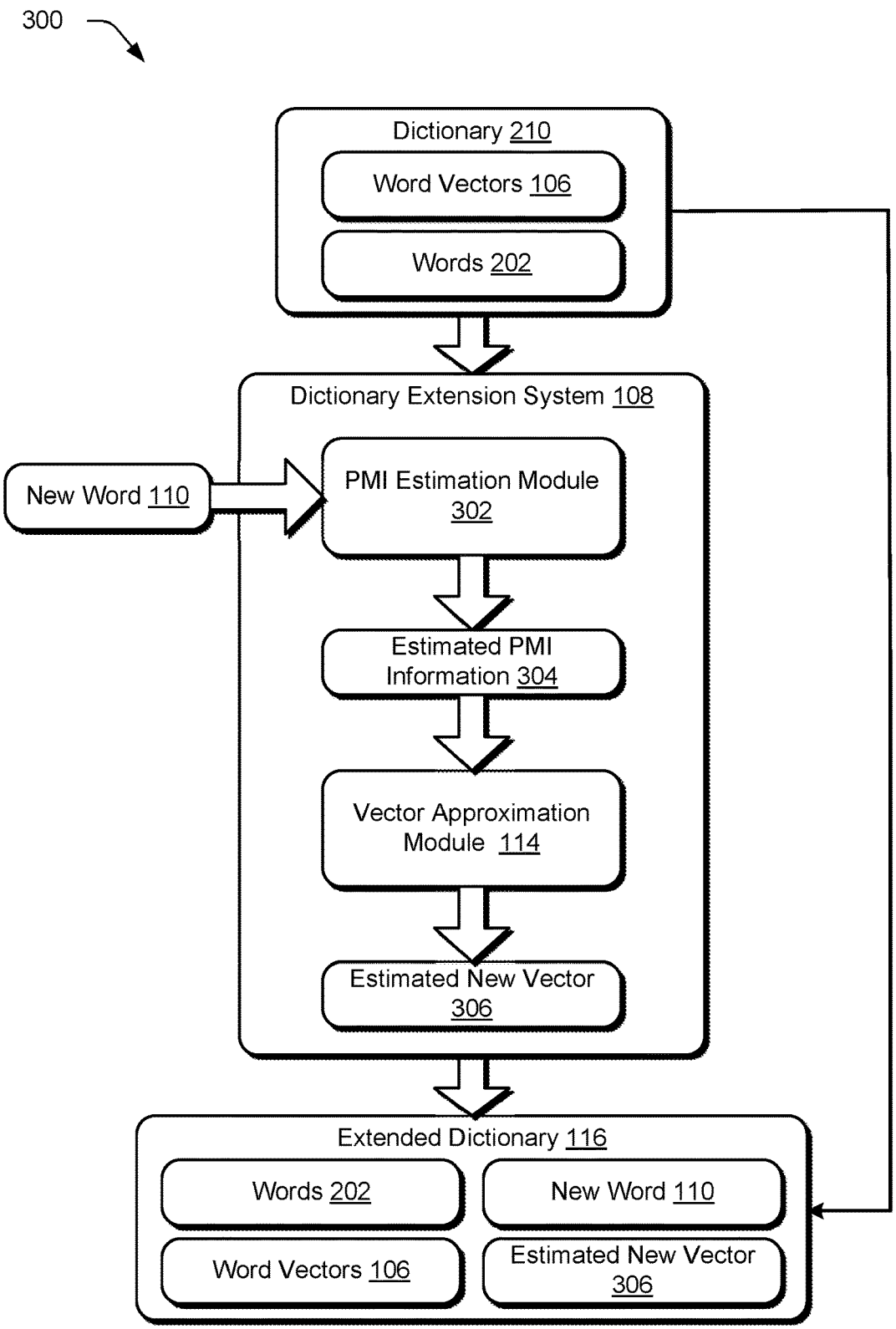
FIG. 3 depicts an example system showing a dictionary extension processing pipeline of the dictionary extension system of FIG. 1 in greater detail.

FIG. 3 depicts a system 300 showing an example dictionary extension processing pipeline of the dictionary extension system 110 of FIG. 1 in greater detail to create the extended dictionary 118. The dictionary extension processing pipeline begins with a PMI estimation module 302 processing the new word 112. The new word 112 is a word that is not included within the words 202, as described in greater detail with respect to FIG. 1. The PMI estimation module 302 utilizes the dictionary 210 to estimate PMI information for the new word 112, resulting in estimated PMI information 304. The PMI estimation module 302 operates without utilizing the PMI module 204 and without altering the PMI data 206. To do so, the PMI estimation module 302 may create the estimated PMI information 304 for a new word $\hat{w}$ in the form of a PMI vector e as follows:

$$\hat{e} = [\hat{e}_0, \hat{e}_1, \ldots, \hat{e}_N]$$

$$\text{where } \hat{e}_i = \log \frac{p(\hat{w}, w_i)}{p(\hat{w})p(w_i)}.$$

Retraining a new set of PMI data 206 with the PMI module 204 would involve a new analysis of the words 202 in their entirety, and would be time consuming, computationally expensive, and inefficient. Instead, the PMI estimation module 302 is capable of utilizing sparse co-occurrence information for the new word 112, such as co-occurrence information extracted from a single document that includes the new word 112 and a small subset of words in the dictionary 210. In this way, the PMI estimation module 302 conserves resources and increases the efficiency of the computing system 102. For example, the sparse co-occurrence information for the new word 112 can be collected simply from a title of a document, a tag list of an image, and so forth.

The estimated PMI information 304 is input to the vector approximation module 116 to create an estimated new vector 306. The vector approximation module 116 operates without utilizing the vector creation module 208 and without altering the word vectors 106. To do so, the vector approximation module 116 projects the estimated PMI information 304 onto the word vectors 106. As an example, the vector approximation module 116 may create the estimated new vector 306, $\hat{h}$, as follows:

$$\hat{h} \approx \hat{e} US^{-1/2}$$

Retraining a new set of word vectors 106 with the vector creation module 208 would involve re-computing an eigenvector decomposition of updated PMI data and computing a new matrix representing the word vectors 106 in their entirety, which would be time consuming, computationally expensive, and inefficient. Instead, the vector approximation module 116 offers a computationally cheap and efficient approximation of the estimated new vector 306.

Experimental results have shown that completely learning a new set of word vectors (such as with the vector creation module 208) has a time complexity of $Cl^2+N^3$, where 'C' is the training corpus size, 'l' is the length of each document in the corpus, and 'N' is the number of words in the dictionary. In contrast, the time complexity of utilizing the vector approximation module 116 to create the estimated new vector 306 is $N^2$. As C and N can easily each have values in the tens of thousands or higher, the vector approximation module 116 is orders of magnitude more efficient. Thus, the vector approximation module 116 provides quantifiable and significant increases in the efficiency of the computing system 102.

The dictionary extension system 110 utilizes the estimated new vector 306 to create the extended dictionary 118. The extended dictionary 118 incorporates the words 202 and the word vectors 106 as well as the new word 112 and the estimated new vector 306. The word vectors 106 remain unchanged in the extended dictionary 118 as compared to the word vectors 106 in the dictionary 210. This allows a system utilizing the word vectors 106 to incorporate the new word 112 without any adverse effect to the system. For example, a natural language processing system may utilize a neural network model built on top of the dictionary 210. In this example, the neural network model will fail to properly function if the word vectors 106 are altered, and any results produced by the neural network model will need to be re-produced using an updated neural network model incorporating the new word 112. The dictionary extension system 110, however, allows the extended dictionary 118 to replace the dictionary 210 in an online manner; as the word vectors 106 are not altered, the neural network model continues to function properly and can incorporate new words into the neural network model incrementally. This incremental extension of a dictionary in an online manner cannot be achieved using conventional means.

The dictionary 210 and the extended dictionary 118 can be utilized in any number of manners. For example, the extended dictionary 118 can be utilized in systems for determining syntactic or semantic word similarities, automatic summarization, machine translation, sentiment analysis, information retrieval, speech recognition, question answering, generating recommendations, comparing images to text, and so forth. However, a system built upon a word vector dictionary requires an amount of calibration based on the vector space of the dictionary. Conventional techniques of creating a new word vector dictionary alter the vector space itself, e.g. by remapping every vector included in the dictionary. Changing the vector space propagates errors throughout the system built upon the dictionary. For example, many natural language processing systems utilize neural network models or other machine learning techniques based upon an underlying dictionary. A neural network model built according to a particular vector space will cease to properly function if the vector space of the dictionary is changed, leading to a rigid inflexibility of word vector dictionaries using conventional techniques. In contrast, the system 300 depicted in FIG. 3 utilizes a process that extends an existing dictionary to incorporate new words and new word vectors without altering the vector space. This allows systems built upon the dictionary to persist through additions to the dictionary, providing robust and adaptive solutions that cannot be achieved through conventional means.

Further, the system 300 depicted in FIG. 3 is capable of extending an existing dictionary to incorporate a new word from a different language than the existing dictionary. For example, a new word may come into existence in a different language that does not have a translation for the language of the dictionary. In this example, the PMI estimation module 302 utilizes a language translator on a document including the unknown word to identify words that do have a translation. The translated words are used to create estimated PMI information 304 for the unknown word based on sparse co-occurrence data collected with respect to the translated words.

Example Procedures

The following discussion describes techniques that may be implemented utilizing the previously described systems and devices. Aspects of the procedures may be implemented in hardware, firmware, software, or a combination thereof. The procedures are shown as sets of blocks that specify operations performed by one or more devices and are not necessarily limited to the orders shown for performing the operations by the respective blocks. In portions of the following discussion, reference will be made to FIGS. 1-3.

Figure 4:
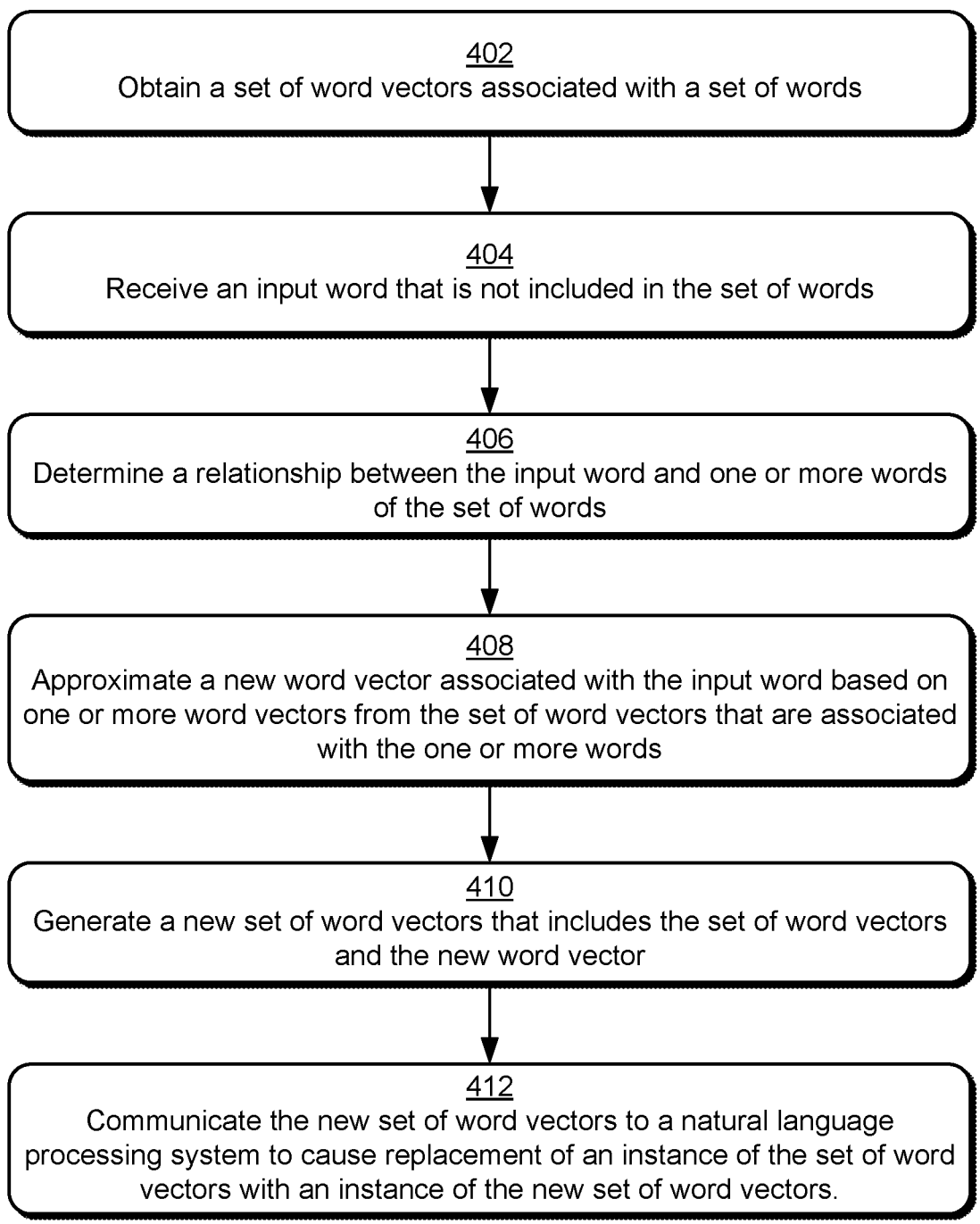
FIG. 4 is a flow diagram depicting a procedure in an example implementation of online dictionary extension of word vectors.

FIG. 4 depicts a procedure 400 in an example implementation of online dictionary extension of word vectors. A set of word vectors associated with a set of words is obtained (block 402). In some implementations, the set of word vectors is precomputed and is obtained by the computing system 102 via the network 108, such that the computing system 102 is not involved in the creation of the word vectors. In other implementations, the computing system 102 utilizes the word vector training system 104 to precompute or create the word vectors as described with respect to FIG. 2. For instance, input words may be analyzed to create PMI data measuring the association and co-occurrence of the input words and stored as a PMI matrix. The PMI matrix may be decomposed using Eigen-vector decomposition to create a word vector matrix including a word vector for each respective input word. As an example, the set of words may include 'dog' and 'hound', and PMI data is created for each of the words 'dog' and 'hound' with respect to all of the words in the set of words. Based on the PMI data, a word vector is created or obtained for each of the words 'dog' and 'hound'.

An input word is received that is not included in the set of words (block 404). Accordingly, the input word does not have a corresponding word vector included in the set of word vectors. Continuing the above example, the input word may be 'wolf'. A relationship is determined between the input word and one or more words of the set of words (block 406). This is performed by utilizing sparse co-occurrence information between the input word and the one or more words. For instance, if the input word is located in a document, co-occurrence information is determined for the input word with respect to words located in the document. This sparse co-occurrence information with respect to a small subset of words is utilized to infer or approximate co-occurrence information with respect to the entire set of words, thereby extending the co-occurrence information to include the input word without generating a new co-occurrence information for the set of words. In the ongoing example with an input word of 'wolf', a relationship is found between 'wolf' and each of 'dog' and 'hound' based on the sparse co-occurrence information.

A new word vector is approximated for the input word based on word vectors from the set of word vectors that are associated with the one or more words (block 408). Continuing the on-going example, both 'dog' and 'hound' are associated with word vectors in the set of word vectors. Based on the relationship between 'wolf' and each of 'dog' and 'hound', a word vector for 'wolf' is approximated based on the word vector for 'dog' and the word vector for 'hound'. This can be performed, for instance, by the vector approximation module 116 as described in greater detail with respect to FIG. 3. The approximation is performed based on the existing word vectors but without altering the existing word vectors. For example, the word vectors for 'dog' and 'hound' are unchanged by the approximation, and new word vectors for 'dog' and 'hound' are not created. Instead, the existing word vectors are leveraged to approximate a 'close-enough' word vector for the input word. In the on-going example, 'wolf' is determined to be similar to both 'dog' and 'hound', and an approximate word vector for 'wolf' is created such as by creating a weighted average of the word vectors for 'dog' and 'hound'.

A new set of word vectors is generated that includes the set of word vectors and the new word vector (block 410). The new set of word vectors is communicated to a natural language processing system to cause replacement of an instance of the set of word vectors with an instance of the new set of word vectors. For instance, the natural language processing system may be the natural language processing system 120 as described with respect to FIG. 1. As an example, the natural language processing system is a word similarity system that functions according to the set of word vectors and in continuation of the on-going example may seek to find a word similar to 'pack canine' In this example, the natural language processing system uses the set of word vectors to select a word vector corresponding to 'pack canine' and determine one or more word vectors in the set of word vectors that are close to the selected vector. Upon finding the close vectors, the word similarity system determines corresponding words and outputs those determined words as being similar to the input word. Prior to receiving the set of new word vectors, the natural language processing system identifies a closest vector corresponding to 'dog', as the set of word vectors does not include 'wolf'. Using conventional techniques, the natural language processing system cannot extend or update its word vector dictionary, and the natural language processing system is unable to improve its accuracy any further. In contrast the natural language processing system can, upon receiving the new set of word vectors and replacing the set of word vectors in step 412, extend its vocabulary in an online manner and more accurately identify that the phrase 'pack canine' has a close similarity to the meaning of the word 'wolf'. In this way, the techniques described by the procedure 400 are capable of improving the accuracy of a natural language processing system beyond that of conventional techniques.

Figure 5:
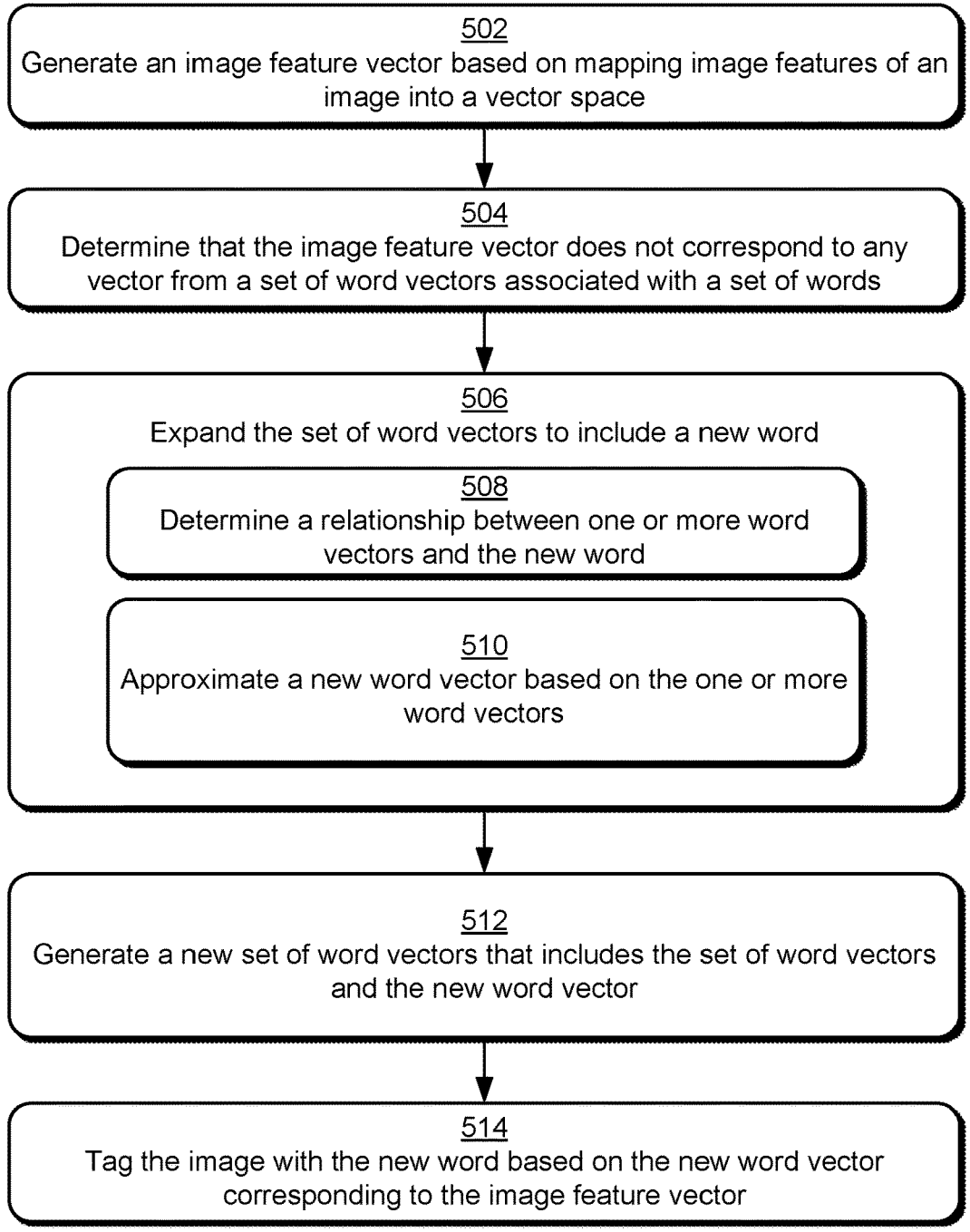
FIG. 5 is a flow diagram depicting a procedure in an example implementation of online dictionary extension of word vectors.

FIG. 5 depicts a procedure 500 in an example implementation of online dictionary extension of word vectors. An image feature vector is generated by mapping image features of an image into a vector space (block 502). This is done, for instance, by performing a computer vision analysis on the image. The computer vision techniques are calibrated or trained such that the vector space used to map image features coincides with a vector space used to generate word vectors. Accordingly, image feature vectors can coincide with or be similar to word vectors that describes the corresponding image features.

It is determined that the image feature vector does not correspond to any vector from a set of word vectors associated with a set of words (block 504). By measuring distances in the vector space between an image feature vector and a word vector, a word can be identified that corresponds to the image feature. In this way, word vectors can be leveraged to provide similarities between images and text, for instance to automatically tag an image with a word. However, the image feature vector may not correspond to any vector in the set of word vectors, such as when the distance between the image feature vector and the nearest word vector is greater than a threshold distance.

The set of word vectors is expanded to include a new word (block 506) by determining a relationship between one or more word vectors and the new word (block 508) and approximating a new word vector based on the one or more word vectors (block 510). The relationship is determined based on co-occurrence information, such as the sparse co-occurrence information as described in greater detail with respect to block 406 of FIG. 4. The approximation is performed based on the one of more word vectors, but without altering the one or more word vectors, such as described with respect to the vector approximation module 116 of FIG. 3 and block 408 of FIG. 4.

A new set of word vectors is generated that includes the set of word vectors and the new word vector (block 512). For instance, the dictionary extension system 110 is utilized to create an extended dictionary. The extended dictionary incorporates both the original words and corresponding vectors and also the new word and the corresponding new word vector. The vector space itself remains unchanged, and thus the original word vectors remain unchanged. By keeping the vector space constant, the image feature vector from block 502 remains accurate and can be compared to the extended dictionary without requiring a new analysis of the image features or a new image feature vector.

The image is tagged with the new word based on the new word vector corresponding to the image feature vector (block 514). The image feature vector is compared to the new set of word vectors from block 512, and it is determined that the image feature vector corresponds to the new word vector. For instance, the distance between the image feature vector and the new word vector is less than a threshold distance. Based on this correspondence, the image feature vector is associated with the new word and the image is tagged with the new word. In this way, an image tagging system built upon a word vector dictionary is extended in an online manner to incorporate new words without adversely affecting the image tagging system itself.

Conventional techniques to create a set of word vectors would alter the vector space, thus breaking the correspondence between image feature vectors and word vectors and requiring development of a new image tagging system utilizing the new vector space. In contrast, the procedure 400 of FIG. 4 and the procedure 500 of FIG. 5 each operate to provide online dictionary extension of word vectors without altering the vector space. This allows systems built upon the dictionary to persist through additions to the dictionary, providing robust and adaptive solutions that cannot be achieved through conventional means.

Having discussed some example procedures, consider now a discussion of an example system and device in accordance with one or more implementations.

Example System and Device

Figure 6:
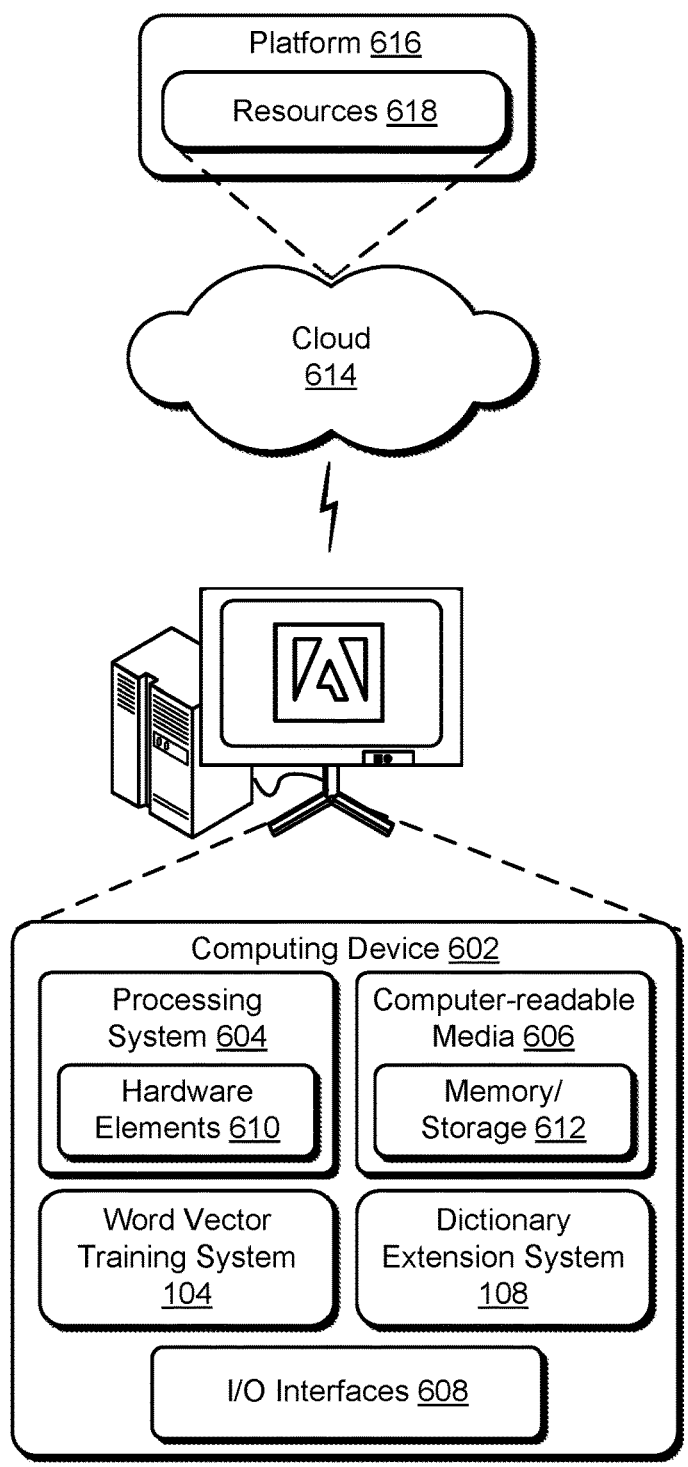
FIG. 6 illustrates an example system including various components of an example device that can be implemented as any type of computing device as described and/or utilized with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein.

This is illustrated through inclusion of the word vector training system 104 and the dictionary extension system 110. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for extending a word vector dictionary, a method implemented by at least one computing device, the method comprising:
   receiving, by the at least one computing device, an input word that is not included in the word vector dictionary, the word vector dictionary including a plurality of words and a corresponding plurality of word vectors based on a vector space;
   locating, by the at least one computing device, one or more words of the plurality of words based on a relationship between the input word and the one or more words, the relationship based on input co-occurrence information for the input word with respect to the one or more words;
   obtaining, by the at least one computing device, one or more word vectors of the plurality of word vectors corresponding to the one or more words;
   generating, by the at least one computing device, an input word vector corresponding to the input word by:
      estimating co-occurrence information for the input word with respect to the plurality of words based on the one or more word vectors and the input co-occurrence information; and
      projecting the estimated co-occurrence information onto the vector space; and
   extending, by the at least one computing device, the word vector dictionary to include the input word and the input word vector.

2. The method of claim 1, wherein the plurality of word vectors are precomputed based on a co-occurrence of words within a text corpus.

3. The method of claim 1, wherein each word vector of the plurality of word vectors includes pointwise mutual information that measures association and co-occurrence.

4. The method of claim 3, wherein the pointwise mutual information is based on uni-gram or bi-gram statistics.

5. The method of claim 1, wherein the extending the word vector dictionary is performed without determining new word vectors corresponding to the plurality of words.

6. The method of claim 1, wherein the plurality of word vectors is precomputed based on a co-occurrence of words within a text corpus, the input word is located in a document not included in the text corpus, and the generating the input word vector is based in part on a co-occurrence of the input word within the document.

7. The method of claim 1, wherein the plurality of words includes words in a first language, and the input word is in a second language.

8. In a digital medium environment for extending a word vector dictionary, at least one non-transitory computer-readable storage medium storing processor-executable instructions that, responsive to execution by a processing system, cause the processing system to perform operations comprising:
   generating an image feature vector based on mapping image features of an image into a vector space;
   determining that the image feature vector does not correspond to any vector from the word vector dictionary, the word vector dictionary including a plurality of words and a corresponding plurality of word vectors based on the vector space;
   extending the word vector dictionary to include an input word vector corresponding to an input word by:
      estimating co-occurrence information for the input word with respect to the plurality of words based on one or more word vectors of the plurality of word vectors and input co-occurrence information for the input word with respect to the one or more words; and
      projecting the estimated co-occurrence information onto the vector space; and
   tagging the image with the input word based on the input word vector corresponding to the image feature vector.

9. The at least one computer-readable storage medium of claim 8, wherein the plurality of word vectors are precomputed based on a co-occurrence of words within a text corpus.

10. The at least one computer-readable storage medium of claim 8, wherein each word vector of the plurality of word vectors includes pointwise mutual information that measures association and co-occurrence.

11. The at least one computer-readable storage medium of claim 10, wherein the pointwise mutual information is based on uni-gram or bi-gram statistics.

12. The at least one computer-readable storage medium of claim 8, wherein the expanding the word vector dictionary is performed without determining new word vectors corresponding to the plurality of words.

13. The at least one computer-readable storage medium of claim 8, wherein the plurality of word vectors is precomputed based on a co-occurrence of words within a text corpus, the new words are located in a document not included in the text corpus, and the input word vector is based in part on a co-occurrence of the new words within the document.

14. The at least one computer-readable storage medium of claim 8, wherein the plurality of words includes words in a first language, and the new words are in a second language.

15. In a digital medium environment for extending a word vector dictionary, a system comprising:
   means for determining that an input word is not included in the word vector dictionary, the word vector dictionary including a plurality of words and a corresponding plurality of word vectors based on a vector space;
   means for locating one or more words of the plurality of words based on a relationship between the input word and the one or more words, the relationship based on input co-occurrence information for the input word with respect to the one or more words;
   means for obtaining one or more word vectors of the plurality of word vectors corresponding to the one or more words;
   means for generating an input word vector corresponding to the input word including:
      means for estimating co-occurrence information for the input word with respect to the plurality of words based on the one or more word vectors and the input co-occurrence information; and
      means for projecting the estimated co-occurrence information onto the vector space; and
   means for extending the word vector dictionary to include the input word and the input word vector.

16. The system of claim 15, wherein each word vector of the plurality of word vectors includes pointwise mutual information that measures association and co-occurrence based on uni-gram or bi-gram statistics.

17. The system of claim 15, wherein the means for extending the word vector dictionary includes means for extending the word vector dictionary without determining new word vectors corresponding to the plurality of words.

18. The system of claim 15, wherein the plurality of word vectors is precomputed based on a co-occurrence of words within a text corpus.

19. The system of claim 18, wherein the input word is located in a document not included in the text corpus and the generating the input word vector is based in part on a co-occurrence of the input word within the document.

20. The system of claim 15, wherein the plurality of words includes words in a first language, and the input word is in a second language.

* * * * *